United States Patent Office 2,825,713
Patented Mar. 4, 1958

2,825,713

COMPOSITIONS COMPRISING AMINE MODIFIED ACETONE FORMALDEHYDE RESIN AND METHOD OF MAKING SAME

Mortimer T. Harvey, South Orange, and Peter L. Rosamilia, Newark, N. J., assignors to Harvel Research Corporation, Irvington, N. J., a corporation of New Jersey No Drawing. Application October 20, 1951
Serial No. 252,412

4 Claims. (Cl. 260—45.2)

This invention is directed to novel compositions of matter and to methods for making them. In one of its more specific aspects the invention is directed to novel combinations including glue, such as animal glue, as a component thereof and is also directed to novel products produced by treating acetone-formaldehyde reaction products.

Heretofore animal glues have found a number of applications in different fields. Such glues in general may be used either alone or together with a plasticizer, humectant or the like to provide the product desired. In some instances it is desirable to produce impregnating and coating compositions for fibrous mattings or woven fabrics composed of paper of wood pulp origin, glass, rayon, and the like. Such compositions may consist of animal glue, and a plasticizing humectant such as glycerine, glucose-dextrin products, hydrogenated glucose products, etc. These various combinations in order to be capable of curing at elevated temperatures require the addition of formaldehyde thereto. In the course of extended experimentation, it has been discovered that highly useful and novel compositions may be produced by combining resinous reaction products of acetone and formaldehyde with animal glues with or without other components such as said plasticizing humectants, etc. In any case, the ratio by weight of the animal glue to said acetone-formaldehyde resinous reaction products is the range of 4–1 to 1–10. The acetone-formaldehyde resinous reaction products are water soluble and thermosetting and may be produced by reacting acetone and formaldehyde under alkaline conditions, with the mole ratio of reactants being preferably 1 mole of acetone to 3–5 moles of formaldehyde.

The following examples, A, B and C are given merely by way of illustrating the manner of producing acetone-formaldehyde reaction products.

EXAMPLE A (1 mole acetone—4 moles of formaldehyde)

300 lbs. acetone
1700 lbs. formaldehyde (37% concentration)
25 lbs. NaOH in
60 lbs. water The caustic soda-water solution was first made up and divided into four equal portions. An autoclave unit was loaded with the acetone and formaldehyde with the steam on and stirring equipment in operation and the mixture was heated to 120–125° F. The first portion of caustic soda-water solution was added and the steam cut off. The temperature of the mixture rises to 130° F. and the cold water is turned on as an exothermic reaction takes place and the temperature slowly rises to 200° F. then slowly begins to fall. At 185° F. the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool 145° F. at which time the cold water is shut off. Vacuum is turned on keeping the vent of the autoclave open. The vent is slowly closed and the steam turned on. Dehydration may be continued to produce a resin of 75%–100% solids. The amount of resin produced measured more than 75% of the combined weights of the acetone and formaldehyde in the original charge. The resin known as product A was amber colored, is thermosetting and is stable for at least 6 months at 30° C., cures to the infusible state within two hours at 140° C.

EXAMPLE B (1 mole of acetone—3 moles of formaldehyde)

30 parts of acetone
126 parts formaldehyde (37% concentration)
2 parts NaOH in
4 parts water The caustic soda-solution was made up and divided into three equal portions. Using the same procedure as that set forth in Example A, the resultant resinous product produced was amber colored and measured more than 75% of the combined weights of acetone and formaldehyde in the original charge. The resin known as product B was soluble in water in up to 200% dilution and insoluble in 600% dilutions in water and is thermosetting. 50 parts of this resin mixed with 5 parts of lime was converted to the solid state at room temperature after about ½ hour which on standing becomes hard, firm, infusible and insoluble in acetone, petroleum spirits, aromatic spirits and chlorinated solvents, also unaffected by alkalies and dilute acids.

EXAMPLE C (1 mole of acetone—5 moles of formaldehyde)

30 parts of acetone
212 parts formaldehyde (37% concentration)
2 parts NaOH in
8 parts water Employing the same procedure as that set forth in Example A except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be about 5.2% of the amount of formaldehyde in the original charge. Upon dehydration at 210° F. in the manner heretofore indicated, the resultant substantially anhydrous thermosetting resin known as product C was an amber colored viscous mass infinitely soluble in water and measuring more than 75% of the combined weight of acetone and formaldehyde in the original charge.

These various water soluble, thermosetting resins, specific illustrations of which are shown in Examples A–C, may be heat converted to the infusible state under acid, neutral or alkaline conditions. Such resins of the thermosetting and water soluble type may also be produced by reacting acetone and formaldehyde in the mole ratio of 1 of acetone to 3–5 of formaldehyde and employing weakly alkaline materials in fairly large amounts and refluxing the mass for long periods of time or by carrying out the reaction at comparatively low temperatures with strong alkalies. However, such procedures are not recommended for commercial production.

The following Examples 1 and 2 are illustrative specific formulations for impregnating and coating, all parts by weight unless otherwise specified.

EXAMPLE 1

300 parts of an aqueous solution containing 80% of product A, B or C and 200 parts of an aqueous solution or dispersion of animal glue containing 20% glue were mixed together and immediately thereafter a woven or matted fibrous sheet was immersed therein, removed therefrom and placed in an oven at 150° F. for 48 hours to provide a board whose fibers were locked to each other by the cured impregnant and coating material.

EXAMPLE 2

Employ the same combination as Example 1 and in addition thereto mixing therewith 100 parts of glycerine, and immediately thereafter impregnate and coat a sheet as set forth in Example 1 and also cure in same manner. The resultant board is more flexible than that of Example 1.

The combinations of animal glue together with said acetone-formaldehyde reaction products in the proportions of 4 of the former to 1–40 of the latter by weight, and with or without ingredients, such as plasticizers, humectants, etc. may be employed as impregnating and coating compositions for matted fabrics which thereafter may be heat cured in an oven. The impregnating and coating combinations are converted to the substantially dry state and serves as tough binders for the fibers of the matted fabric. Such products find application in the fields of of gaskets, floorings, liners, etc.

In some cases, factory practice requires that large batches of the impregnating compositions be maintained in tanks at 150°–160° F. for extended periods of time and ready for use. It has been found that the novel combinations of animal glue and acetone-formaldehyde gel when maintained at such temperature for 48 hours or more. When a composition consisting by weight of 300 parts of an 80% aqueous solution of said acetone-formaldehyde resin and 200 parts of a 20% aqueous solution of animal glue is maintained at 140° F., it gels overnight. The gellation is due to the free formaldehyde present in the acetone-formaldehyde resin added to the glue, together with possibly the small amount of free formaldehyde which might be liberated from said resin at 140°–160° F.

In order that such combinations may be used in that type of factory practice, the acetone-formaldehyde resinous material required modification so that such combinations may be maintained in large tank batches at 150°–160° F. for a week or more without substantial gellation occurring.

An attempt was made to modify said acetone-formaldehyde resin by treating it with hydrogen peroxide. As much as 20 parts of a 35% aqueous solution of hydrogen peroxide was added to 80 parts of an 80% aqueous solution of said resin and the mix was stirred while heating to about 80° C. for extended periods of time in an effort to modify the resin for the purpose intended. The resultant product was tested by maintaining in an oven for 48 hours a combination of 300 parts of an 80% aqueous solution thereof and 200 parts of a 20% aqueous solution of animal glue. At the end of that period the mass had gelled. Thus even this expensive modifier failed.

In further accordance with this invention, the resinous acetone-formaldehyde reaction products, examples of which are products A, B and C are modified by reaction with an amine capable of reacting with the formaldehyde. The amines which I prefer to employ are those which are water soluble, capable of reacting with formaldehyde and preferably at room temperature, and whose formaldehyde reaction products are water soluble and compatible with an 80% aqueous solution of said resinous reaction products. The amount of amine employed is a quantity sufficient to react with the free formaldehyde present together with that which may be liberated from the acetone-formaldehyde at 160° F. In general the quantity of amine employed is at least 10% of the acetone-formaldehyde resin to be treated, and usually is employed in any desired excess of that required to assure reaction with the free formaldehyde. Examples of said amines are butylamine, ethylene diamine, triethylene tetramine, tetraethylene pentamine, propylene diamine, morpholine, monoethanolamine, diethanolamine, triethanolamine, diethyl ethanolamine, tri-isopropanolamine, tetra ethanol ammonium hydroxide, diethylene triamine, aminoethyl ethanolamine.

Even after the free formaldehyde has been substantially completely eliminated from said resinous acetone-formaldehyde reaction product by reaction in the manner heretofore set forth or in any other manner it is preferable to combine therewith at least 20% by weight thereof of an organic reaction product of one or more of said amines and an organic acid. Said amine-organic acid reaction product is soluble in an 80% aqueous solution of said acetone-formaldehyde resin and is produced by reacting one of said amines with an organic acid. Any of the organic acids has one or more COOH groups, is water soluble, is soluble in an 80% aqueous solution of said resin and is capable of reacting with said amines to produce the afore-defined organic reaction products, will not cause precipitation or cause the formation of water insoluble reaction products in such solution, and is capable of reducing the pH of said resinous solution to a value of 5–7. Illustrative examples of said acids are hydroxy acetic, lactic, maleic, malonic, acetic, as well as their available anhydrides.

Consequently after the treatment with the amine as before set forth, there is preferably added to that mass a quantity of one or more of said organic acids which reacts with the amine present therein to produce organic reaction product thereof as before defined. The quantity of said organic acid employed is sufficient so that at least about 20 and up to 400 parts of said reaction product is in combination with 100 parts of said resin and at the same time lowers the pH of the mass to a value no greater than 7 and preferably 5–7.

Still another method which may be employed is to separately react said amine and organic acid and then add the requisite quantity in general about 30 to 400 parts by weight to 100 parts by weight of said acetone-formaldehyde resin or 20 to 400 parts by weight or 20 to 400 parts to 100 parts of said acetone-formaldehyde resin by weight after the formaldehyde has been eliminated.

The method which is preferably employed is to add the organic acid to the acetone-formaldehyde resin product and then to this mass add the amine, the quantities added being determined by the proportion of the organic acid-amine reaction product desired in the combination and the required pH of the mass.

The following examples are given merely by way of illustrating the methods for making illustrative modified acetone-formaldehyde reaction products according to this invention, all parts given by weight unless otherwise specified.

EXAMPLE 3

100 parts of a clear 80% aqueous solution of product A is charged into a container and then there is added thereto with stirring 15 parts of ethanolamine whereupon there is an exothermic reaction. Stirring may be continued for an additional 20 minutes, the mass is allowed to cool to room temperature and is clear. Then add 22 parts of hydroxy acetic acid, exothermic reaction occurs. Allow to cool. Resultant solution is clear aqueous solution of the resultant product hereinafter termed product AM.

EXAMPLE 4

300 parts of an 80% aqueous solution of product B is mixed with 45 parts of hydroxy acetic acid and there being a slight temperature increase. Then 30 parts of ethanolamine are stirred into said solution and temperature rises to approximately 70° C. Stir for half hour and permit to come to room temperature. The resultant mass is an aqueous solution of product hereinafter known as product BM.

EXAMPLE 5

Employ same procedure as Example 2. Use 300 parts of 80% aqueous solution of product C, 60 parts of lactic acid and 45 parts ethanolamine. The resultant mass is an aqueous solution of product hereinafter known as product CM.

EXAMPLE 6

Employ same procedure as Example 4. Use 100 parts of 80% aqueous solution of product A, 45 parts of hydroxy acetic acid and 30 parts of ethanolamine. The resultant mass is an aqueous solution of product hereinafter known as product AM–1.

EXAMPLE 7

Employ same procedure as Example 4. Use 100 parts of 80% aqueous solution of product A, 400 parts of hydroxy acetic acid and 200 parts of ethanolamine. The resultant mass is an aqueous solution of product hereinafter known as product AM.

The modified acetone-formaldehyde reaction products, such as those exemplified in Examples 3–7, as well as product A or any other acetone-formaldehyde reaction product produced with 1 mole of acetone to 3–5 moles of formaldehyde and modified according to Examples 3–7 may be mixed with an aqueous solution of glue and by the term solution I mean either true solution or dispersion to provide the novel combinations of this invention which may include additional ingredients, such as plasticizers, humectants, etc. In such combinations the modified acetone-formaldehyde resins also act as plasticizers and humectants, increase the solvent resistance in the end products produced and are inexpensive and eliminate the necessity of requiring the addition of formaldehyde.

All of these modified acetone-formaldehyde reaction products are eminently suitable for the purpose intended and in general are combined with animal glue in aqueous solution in the proportions by weight of 1–40 of the former to 4 of the latter; one of the tests employed is to combine an 80% aqueous solution of said modified reaction products with a 20% aqueous solution of animal glue. All of said modified reaction products in such test combinations provided combinations which did not exhibit any appreciable gellation after being maintained at 140° F. for 48 hours. Such novel combinations are thermosetting and may be heat converted to the infusible state.

The following are specific illustrative examples of the invention, all parts given by weight.

EXAMPLE 8

An aqueous solution consisting of 75 parts of animal glue in 300 parts of water, were mixed with 100 parts of glycerine and 100 parts of an 80% aqueous solution of product AM, BM, CM, AM–1 or AM–2.

EXAMPLE 9

An aqueous solution consisting of 75 parts of animal glue in 300 parts of water were mixed with 200 parts of an 80% aqueous solution of product AM, BM, CM, AM–1 or AM–2.

EXAMPLE 10

66 parts of animal glue, 105 parts of glycerine, 100 parts of product AM, BM, CM, AM–1 or AM–2, and 500 parts of water were combined by first dissolving the glue in the water. Then the glycerine and resin product were added and stirred to homogeneity.

The various combinations of glue and modified acetone-formaldehyde resinous reaction products, illustrative examples of which are set forth in Examples 8–10, may be maintained at 160° F. for indefinite periods of time. Fibrous mattings of paper of wood pulp origin, glass, rayon or the like were coated and impregnated with said combinations, containing the high proportion of glue and subsequently dried and then cured to provide tough articles of manufacture whose flexibility can be controlled by the use of glycerine, etc. These finished items find utility in the gasket, liner and other fields. Said combinations containing the low proportion of glue find application as adhesives for book bindings and in addition may be used for the production of printing rolls.

Still another aspect of this invention is directed to combining animal glue with said amine-organic acid reaction products, the ratio by weight of the former to the latter being 3 to 1–3. Such combinations are generally made in water to provide aqueous solutions thereof of desired concentration and may be used as binders in book bindings etc. and also for printing rolls. They also may be added to acetone-formaldehyde reaction products to produce combinations of the type heretofore set forth.

We claim:

1. A novel composition of matter comprising (a) a normally thermosetting water-soluble resinous acetone-formaldehyde reaction product and (b) an organic reaction product of an amine which is water-soluble and formaldehyde reactive to produce water soluble organic reaction product and a water-soluble organic carboxylic acid capable of reacting with said amine to produce a water-soluble organic reaction product, the ratio by weight of (a) to (b) being in the range of 1–4 to 4–1, said resinous product produced by reacting acetone and formaldehyde under alkaline conditions, with the mole ratio of acetone to formaldehyde being 1 of acetone to 3–5 moles of formaldehyde, the amount of amine employed being at least 20% by weight of said resinous product with said amine selected from the group consisting of butylamine, ethylene diamine, triethylene tetramine, tetraethylene pentamine, propylene diamine, morpholine, monoethanolamine, diethanolamine, triethanolamine, diethyl ethanolamine, tri-isopropanolamine, tetraethanol ammonium hydroxide, diethylene triamine and aminoethyl ethanolamine.

2. A paper gasket and a binder for the paper fibers thereof comprising a heat cured combination of animal glue and the composition defined in claim 1.

3. The method comprising to a normally thermosetting and water-soluble resinous reaction product of acetone and formaldehyde adding an amine and an organic carboxylic acid, said amine being water soluble and formaldehyde reactive to produce water soluble reaction product, said acid being water soluble and capable of reacting with said amine to produce water soluble reaction product, said resinous product produced by reacting acetone and formaldehyde under alkaline conditions, with the mole ratio of acetone to formaldehyde being 1 of acetone to 3–5 moles of formaldehyde, the amount of amine employed being at least 20% by weight of said resinous product, with said amine selected from the group consisting of butylamine, ethylene diamine, triethylene tetramine, tetraethylene pentamine, propylene diamine, morpholine, monoethanolamine, diethanolamine, triethanolamine, diethyl ethanolamine, tri-isopropanolamine, tetraethanol ammonium hydroxide, diethylene triamine and aminoethylethanolamine.

4. The method comprising to an aqueous solution of a normally thermosetting and water soluble acetone-formaldehyde reaction product adding an organic carboxylic acid in quantity sufficient to reduce the pH to a value of approximately 5–7, said acid being water soluble and then to said mass adding a quantity of an amine which is water soluble and formaldehyde reactive to produce reaction product soluble in said mass, said amine being capable of reacting with said acid to produce reaction product soluble in said aqueous solution, said resinous product produced by reacting acetone and formaldehyde under alkaline conditions, with the mole ratio of acetone to formaldehyde being 1 of acetone to 3–5 moles of formaldehyde, the amount of amine employed being at least 20% by weight of said resinous product with said amine selected from the group consisting of butylamine, ethylene diamine, triethylene tetramine, tetraethylene pentamine, propylene diamine, morpholine, monoethanolamine, diethanolamine, triethanolamine, diethyl ethanolamine, tri-isopropanolamine, tetraethanol ammonium hydroxide, diethylene triamine and aminoethyl ethanolamine.

References Cited in the file of this patent

UNITED STATES PATENTS

| | | |
|---|---|---|
| 2,053,850 | Sturken | Sept. 8, 1936 |
| 2,170,273 | Morgan | Aug. 22, 1939 |
| 2,289,775 | Graves | July 14, 1942 |
| 2,364,900 | Hessel et al. | Dec. 12, 1944 |
| 2,389,682 | Nebel | Nov. 27, 1945 |

OTHER REFERENCES

Van Nostrand Chemical Dictionary, 1953, page 28.
Lange's Handbook of Chemistry, 4th edition, page 457.
Lange's Handbook of Chemistry, 4th edition, pages 268 and 269.
Payne: Organic Coating Technology, volume 1, pages 326–329 and 333–335.
Van Nostrand Chemical Dictionary, 1953, page 21.